(12) United States Patent
Eguchi (10) Patent No.: US 12,463,569 B2
(45) Date of Patent: Nov. 4, 2025

(54) CONTROL DEVICE FOR THREE-PHASE ALTERNATING CURRENT MOTOR

(71) Applicant: OKUMA Corporation, Aichi (JP)

(72) Inventor: Satoshi Eguchi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 156 days.

(21) Appl. No.: 18/527,631

(22) Filed: Dec. 4, 2023

(65) Prior Publication Data

US 2024/0195334 A1 Jun. 13, 2024

(30) Foreign Application Priority Data

Dec. 7, 2022 (JP) .................................. 2022-195912

(51) Int. Cl.
*H02P 21/09* (2016.01)
*H02P 21/22* (2016.01)

(52) U.S. Cl.
CPC .............. *H02P 21/09* (2016.02); *H02P 21/22* (2016.02)

(58) Field of Classification Search
CPC ................................ H02P 21/09; H02P 21/22
See application file for complete search history.

(56) References Cited

U.S. PATENT DOCUMENTS

| 5,093,609 A | 3/1992 | Sakamoto et al. |
| 2011/0175558 A1* | 7/2011 | Kitanaka ................. H02P 21/22 |
| | | 318/400.3 |
| 2015/0372630 A1* | 12/2015 | Ishikawa ................. H02P 21/18 |
| | | 318/400.02 |

FOREIGN PATENT DOCUMENTS

JP H01186182 A 7/1989

* cited by examiner

Primary Examiner — Zoheb S Imtiaz
(74) Attorney, Agent, or Firm — CANTOR COLBURN LLP (57) ABSTRACT

A control device, which is configured to control current of a three-phase alternating current motor by d-q axis control, includes a q-axis current controller configured to receive, as one input, an acceleration torque command value $\tau_f$ calculated based on a position command value X, and output a controller output voltage $\Delta e_q$ to be added to a q-axis voltage command value $v_q{}^*$. The q-axis current controller calculates, based on the acceleration torque command value $\tau_f$, an acceleration q-axis current command value $i_{qf}{}^*$, which is a current command value corresponding to the acceleration torque command value $\tau_f$, and adds, to the controller output voltage $\Delta e_q$, a value obtained by multiplying the acceleration q-axis current command value $i_{qf}{}^*$ by an IP coefficient $K_{IP}$ indicating a ratio of switching between PI control and I-P control and by a q-axis proportional gain $G_{qp}$.

4 Claims, 9 Drawing Sheets

CONTROL DEVICE FOR THREE-PHASE ALTERNATING CURRENT MOTOR

CROSS REFERENCE TO RELATED APPLICATION

The present invention claims priority under 35 U.S.C. § 119 to Japanese Application, 2022-195912, filed on Dec. 7, 2022, the entire contents of which being incorporated herein by reference.

TECHNICAL FIELD

The present specification discloses a control device that controls a three-phase alternating current motor (such as a synchronous motor or an induction motor) in order to control at least one of speed, position, and transmitted torque of a shaft (such as a feed shaft or a main spindle) in an NC machine tool or the like, or of an object to be controlled in a general industrial machine.

BACKGROUND

Generally, in a control device used for controlling a shaft in an NC machine tool, a three-phase alternating current motor (hereinafter referred to as an "alternating current motor" or "motor") is employed as an actuator. Further, in the control device, a multiple control loop regarding position, speed, and current is provided for position command values output from a host device, to thereby achieve sufficient control stability and high position command following performance.

Figure 9:
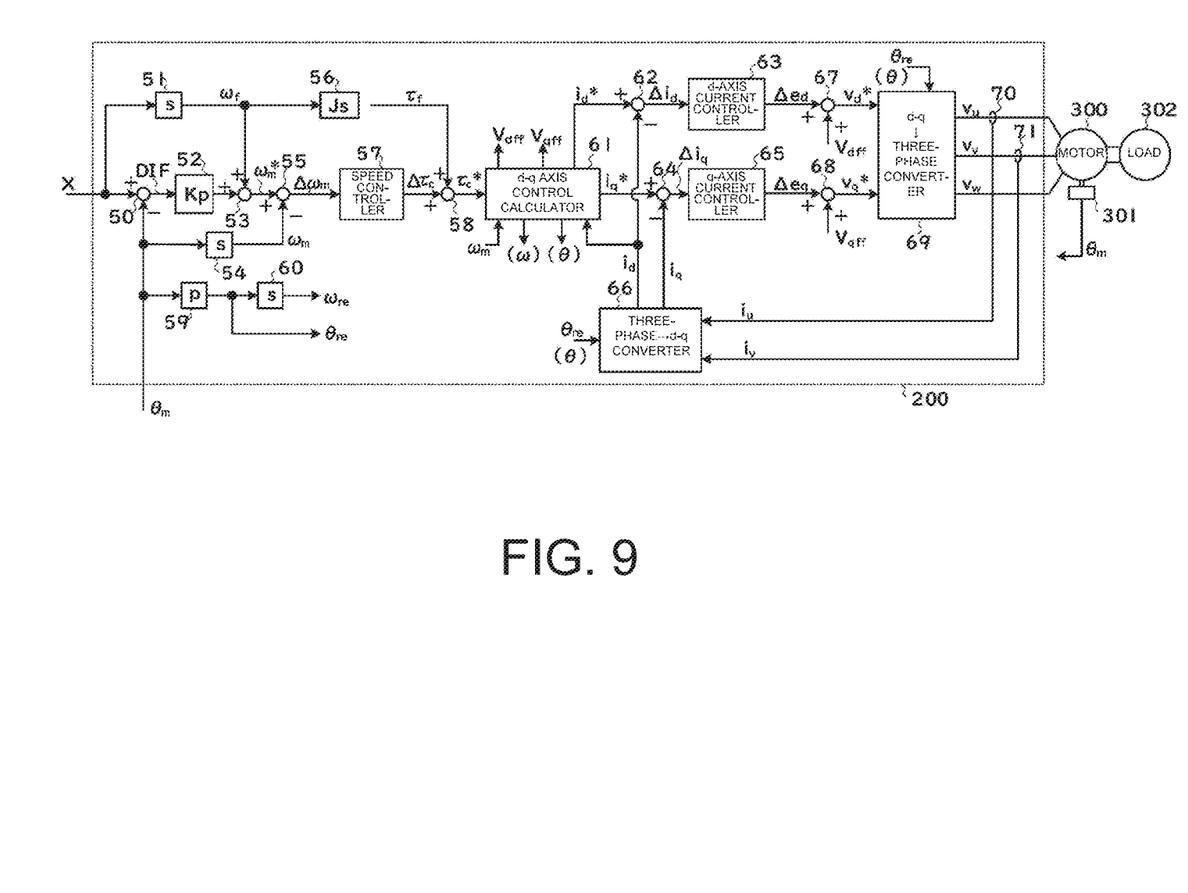
FIG. 9 is a block diagram showing an example configuration of a conventional control device using a three-phase alternating current motor as a drive motor.

FIG. 9 is a block diagram showing an example of a conventional control device 200 using a three-phase alternating current motor as a drive motor. The conventional control device 200 will now be described. From a host device (not shown in drawing), a position command value X is output to the conventional control device 200. A rotation angle θm of a motor 300 output from a position detector 301 fastened to the motor 300 is a position detection value indicating the position of a load 302 (such as a driven table) that is connected to and driven by the motor 300. The rotation angle θm is subtracted from the position command value X in a subtractor 50, and the resulting output is a position deviation DIF.

The position deviation DIF is amplified by a factor of a position loop gain Kp in a position deviation amplifier 52. Meanwhile, the position command value X is differentiated with respect to time in a differentiator 51 (wherein s corresponds to a Laplace transform operator), and a sub speed command ωf is output. An adder 53 adds together the sub speed command value ωf and the output of the position deviation amplifier 52, and outputs a final speed command value ωm*.

A differentiator 54 differentiates the position detection value θm with respect to time, and outputs a speed detection value ωm. In a subtractor 55, the speed detection value ωm is subtracted from the speed command value ωm*. A speed deviation Δωm, which is the output from the subtractor 55, is subjected to PI (proportional-integral) amplification in a speed controller 57. Meanwhile, the sub speed command value ωf is differentiated with respect to time and then multiplied by J in a differentiator 56, and an acceleration torque command value τf for the motor is thereby obtained. Here, J is the total moment of inertia; that is, the moment of inertia of the motor+the moment of inertia of the load. An adder 58 adds together the output Δτc of the speed controller 57 (hereinafter referred to as a "controller output torque Δτc") and the acceleration torque command value $\tau_f$, and a final torque command value τc* is thereby obtained.

In the case of permanent magnet synchronous motors (which are generally classified into surface magnet synchronous motors (SPMSM) and interior magnet synchronous motors (IPMSM)) and reluctance synchronous motors (SynRM), a d-q axis control calculator 61 calculates and outputs a q-axis current command value iq* and a d-axis current command value id* with regard to the motor torque command value τc* based on the N-τ(speed-torque) characteristic, the speed detection value ωm, and the like.

On the other hand, in the case of induction motors (IM), the d-q axis control calculator 61 calculates a d-axis current command value id* based on the field-weakening characteristic of the induction motor and the speed detection value ωm, calculates a d-axis secondary magnetic flux (φdr/M) based on a d-axis current detection value id, and calculates and outputs a q-axis current command value iq* based on the torque command value τc* and the d-axis secondary magnetic flux (φdr/M). Further, based on the d-axis current detection value id and the q-axis current command value iq*, the d-q axis control calculator 61 calculates a slip angular speed ωs, adds together this and an electric angular speed ωre described later (not shown in drawing), and thereby calculates and outputs a current angular speed ω and a current phase angle θ which is a time integral thereof.

A d-axis voltage feedforward Vdff and a q-axis voltage feedforward Vqff, which are output from the d-q axis control calculator 61, are composed of a voltage compensation value for decoupling between d-axis and q-axis or the like (not shown in drawing), and are used for improving current control response.

In a multiplier 59, the position detection value θm is multiplied by the number of motor pole pairs p, and an electric angle θre is thereby obtained. A differentiator 60 differentiates the electric angle θre with respect to time, and outputs an electric angular speed ωre. (Typically, in a synchronous motor, electric angular speed ωre=current angular speed ω.) A U-phase current iu and a V-phase current iv of the motor are detected by a U-phase current detection circuit 70 and a V-phase current detection circuit 71.

A W-phase current iw can be calculated by iw=−(iu+iv). Since iu+iv+iw=0 holds true in a three-phase current, it is typical to detect two phases out of the three phases and determine the remaining one phase by calculation. A three-phase/d-q converter 66 calculates and outputs a d-axis current detection value id and a q-axis current detection value iq by performing coordinate conversion based on the U-phase current iu, the V-phase current iv, and the electric angle θre (or, in the case of an IM, the current phase angle θ).

A subtractor 62 subtracts the d-axis current detection value id from the d-axis current command value id*, and thereby calculates a d-axis current error Δid. A d-axis current controller 63 is an error amplifier that performs PI (proportional-integral) amplification of the d-axis current error Δid, and Δed denotes an output voltage of the d-axis current controller 63.

A subtractor 64 subtracts the q-axis current detection value iq from the q-axis current command value iq*, and thereby calculates a q-axis current error Δiq. A q-axis current controller 65 is an error amplifier that performs amplification of the q-axis current error Δiq, and Δeq denotes an output voltage of the q-axis current controller 65 (hereinafter referred to as a "controller output voltage Δeq").

The operation of the q-axis current controller 65 as an error amplifier is generally represented by formula (1) and formula (2).

$$\Delta e_q = \Delta i_q (G_{qp} + G_{qi}/s) \quad (1)$$

$$\Delta e_q = -i_q G_{qp} + \Delta i_q G_{qi}/s \quad (2)$$

Here, $G_{qp}$ denotes a q-axis proportional gain, and $G_{qi}$ denotes a q-axis integral gain. Formula (1) is referred to as PI control, while formula (2) is referred to as I-P control.

Figure 10:
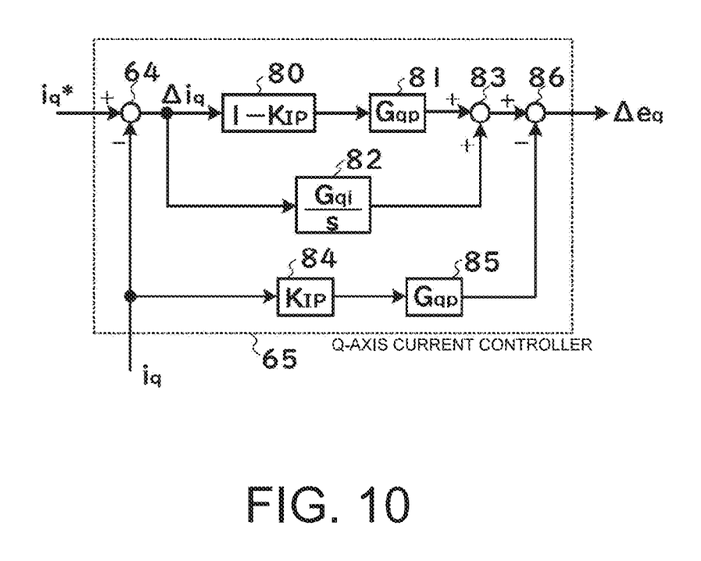
FIG. 10 is a block diagram showing an example configuration of a conventional q-axis current controller.

FIG. 10 shows another example configuration of the q-axis current controller 65. The q-axis current error $\Delta i_q$ is amplified by a factor of $(1-K_{IP})$ in an amplifier 80, and then amplified by a factor of the proportional gain $G_{qp}$ in a proportional amplifier 81. Meanwhile, the q-axis current error $\Delta i_q$ is subjected to integral amplification in an integral amplifier 82 having the integral gain $G_{qi}$, and added to the output of the proportional amplifier 81 in an adder 83. The q-axis current detection value $i_q$ is amplified by a factor of $K_{IP}$ in an amplifier 84, and then amplified by a factor of the proportional gain $G_{qp}$ in a proportional amplifier 85. A subtractor 86 subtracts the output of the proportional amplifier 85 from the output of the adder 83, and outputs the controller output voltage $\Delta e_q$.

The operation of the q-axis current controller 65 shown in FIG. 10 can be represented by formula (3).

$$\Delta e_q = (I - K_{IP}) i_q * G_{qp} - i_q G_{qb} + \Delta i_q G_{qi}/s \quad (3)$$

Here, the IP coefficient $K_{IP}$ is a variable that assumes values within the range of $0 \leq K_{IP} \leq 1$ depending on the state of control. When $K_{IP}=0$, PI control is applied, and when $K_{IP}=1$, I-P control is applied.

An adder 67 adds together the output voltage $\Delta e_d$ of the d-axis current controller 63 and the d-axis voltage feedforward $V_{dff}$, and outputs a d-axis voltage command value $v_d^*$. Similarly, an adder 68 adds together the controller output voltage $\Delta e_q$ of the q-axis current controller 65 and the q-axis voltage feedforward $V_{qff}$, and outputs a q-axis voltage command value $v_q^*$.

A d-q/three-phase converter 69 performs coordinate conversion based on the d-axis voltage command value $v_d^*$, the q-axis voltage command value $v_q^*$, and the electric angle θre (or, in the case of an IM, the current phase angle θ) to obtain converted voltage command values for respective U, V, and W phases. These voltage command values are subjected to power amplification in a PWM inverter (not shown in drawing), and output as phase voltages ($v_u$, $v_v$, $v_w$) for motor drive. The output phase voltages are applied to the respective phases of the motor, and phase currents are thereby generated.

The configuration of the example conventional control device 200 is as described above. In order to control the position detection value θm of the load 302, which is the object to be controlled, with high accuracy in accordance with the position command value X, it is necessary, in the current control loop which is the most minor loop, to provide for high control performance especially in the q-axis current controller 65 for controlling torque.

Control performance of the q-axis current control loop will now be explained by reference to FIG. 10. Generally, in the case of PI control (where KIP=0), high command following performance and good responsiveness are achieved, so that PI control is suitable for servo applications. However, when the control gains (Gqp and Gqi) are increased, vibration tends to occur due to the control, and stability decreases.

On the other hand, in the case of I-P control (where KIP=1), stability is high, and vibration due to the control does not easily occur even when the control gains are increased in order to suppress voltage disturbance, but command following performance is low, so that I-P control is suitable for regulator applications. In other words, sufficient command following performance cannot be achieved in the control device.

In view of the tendency of the q-axis current error Δiq being decreased in regulator applications and increased in servo applications, there are cases where the IP coefficient KIP is variably controlled in accordance with the magnitude |Δiq| of the q-axis current error Δiq such that, when |Δiq| decreases (toward 0), KIP is increased toward 1, and when |Δiq| increases, KIP is decreased toward 0. However, even at times of acceleration and deceleration during which |Δiq| increases, control devices of recent years are increasingly required to have not only sufficient command following performance but also high disturbance suppression performance and stability.

The present specification discloses a control device for three-phase alternating current motor, wherein the control device uses d-q axis control for performing current control in a three-phase alternating current motor so as to control torque, speed, and position of a feed shaft or main spindle, and comprises a q-axis current controller which can ensure high command following performance equivalent to that exhibited by PI control while maintaining high disturbance suppression performance and stability exhibited by I-P control.

SUMMARY

In a control device as disclosed in the present specification, based on an acceleration torque command value τf for a three-phase alternating current motor, an acceleration q-axis current command value iqf* is calculated, and KIP·iqf*·Gqp is added, as proportional compensation, to a controller output voltage Δeq of a q-axis current controller.

In a control device for three-phase alternating current motor as disclosed in the present specification, under the condition of the IP coefficient KIP=1, a difference (iqf*−iq) between the acceleration q-axis current command value iqf* and a q-axis current detection value iq is amplified by the q-axis proportional gain Gqp, and used as a proportional component of the q-axis current controller. By doing so, it is possible to maintain high disturbance suppression performance and stability exhibited by I-P control, and also cause the q-axis current detection value iq to be imparted with high command following performance with respect to the acceleration q-axis current command value iqf*.

Further, a mechanical vibration component mixed in a speed detection value ωm and contained in a q-axis current command value iq* is not amplified by Gqp. Accordingly, the response gain of the q-axis current controller with respect to mechanical resonance frequencies can be significantly decreased as compared with that in PI control. As a result, it is possible to reduce vibration suppression filters, such as notch filters, inserted in the speed control loop.

BRIEF DESCRIPTION OF DRAWINGS

Embodiment(s) of the present disclosure will be described based on the following figures, wherein.

DESCRIPTION OF EMBODIMENTS

Figure 1:
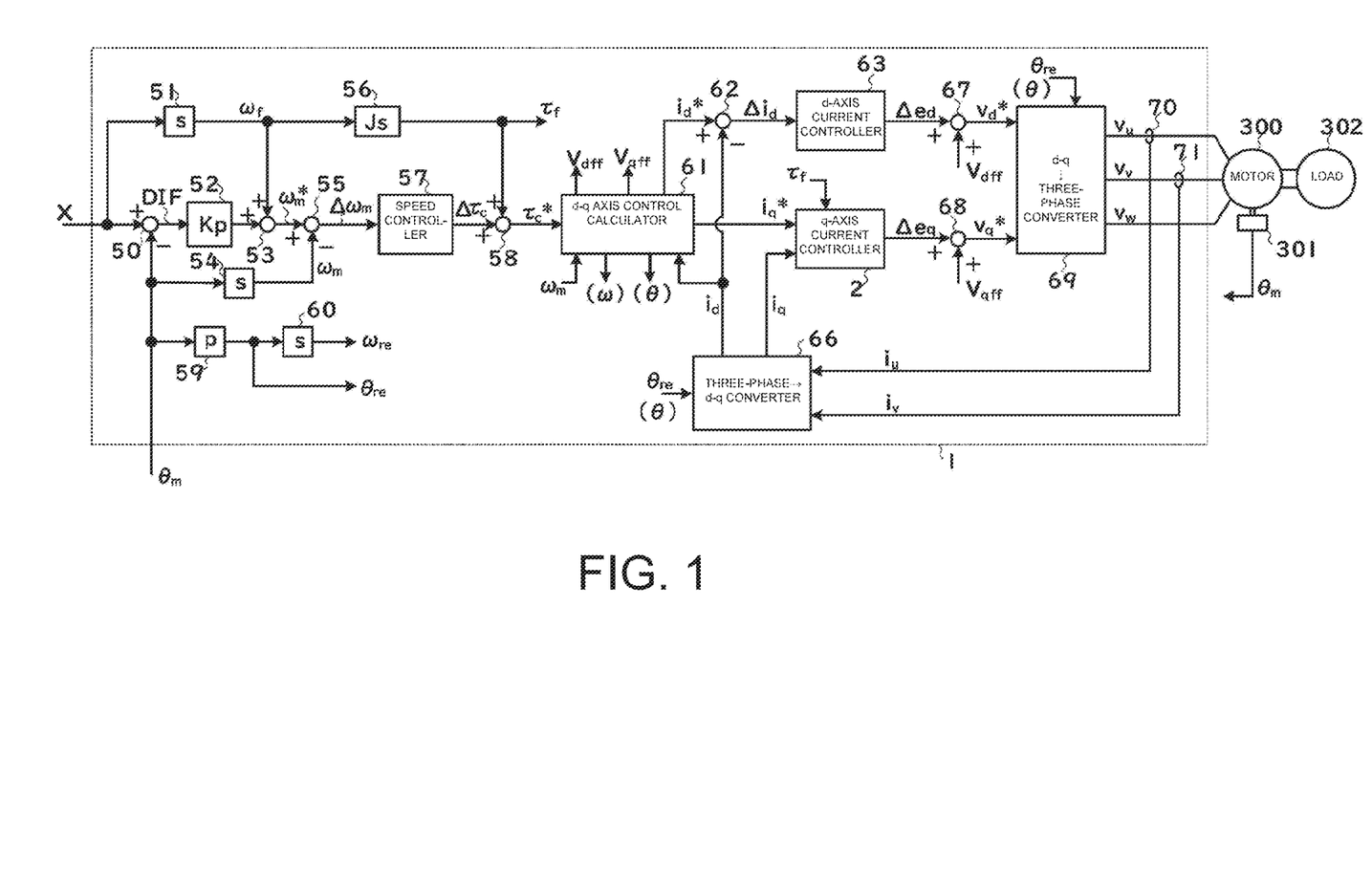
FIG. 1 is a block diagram showing an example configuration of a control device using a three-phase alternating current motor as a drive motor.

FIG. 1 is a block diagram showing a configuration overview of a control device 1 for three-phase alternating current motor. The control device 1 is, for example, a computer including a processor and a memory. Since parts of the control device 1 other than a q-axis current controller 2 are identical to those in the conventional example described above, like reference numerals are assigned thereto, and description thereof will not be repeated.

Figure 2:
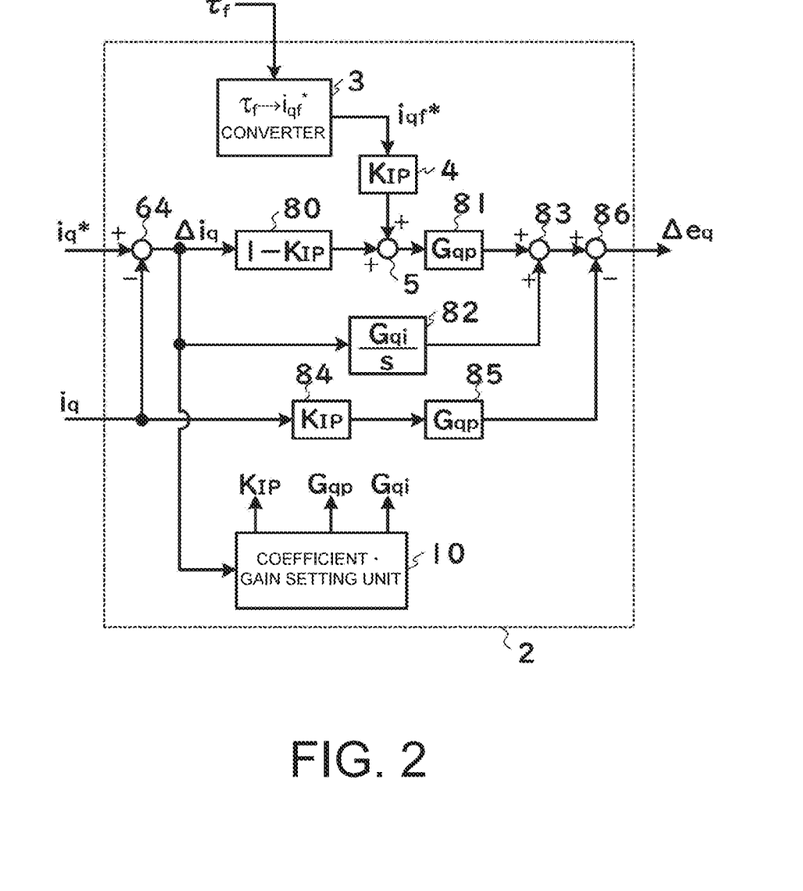
FIG. 2 is a block diagram showing an example configuration of a q-axis current controller.

The q-axis current controller 2 receives input of a q-axis current command value iq* which is an output of the d-q axis control calculator 61, an acceleration torque command value τf, and a q-axis current detection value iq, and outputs a controller output voltage Δeq. FIG. 2 is a block diagram showing an example configuration of the q-axis current controller 2. The operation of the q-axis current controller 2 will now be described using FIG. 2.

In comparison with the conventional q-axis current controller 65, the q-axis current controller 2 further comprises a τf/iqf* converter 3, an amplifier 4, and an adder 5. The τf/iqf* converter 3 receives input of an acceleration torque command value τf, and outputs an acceleration q-axis current command value iqf*. The acceleration torque command value τf is a value obtained by twice differentiating a position command value X with respect to time and multiplying the obtained value by the total moment of inertia J. Accordingly, the acceleration torque command value τf is a value independent from position detection value θm.

The amplifier 4 amplifies the acceleration q-axis current command value iqf* by a factor of KIP. The adder 5 adds together an output obtained by amplifying a q-axis current error Δiq by a factor of (1−KIP) in an amplifier 80 and an output value of the amplifier 4. The output from the adder 5 is amplified by a factor of a proportional gain Gqp in a proportional amplifier 81. With respect to the output of the proportional amplifier 81, other values are added thereto or subtracted therefrom in an adder 83 and in a subtractor 86, and a controller output voltage Δeq is thereby obtained. Accordingly, it can be said that in the q-axis current controller 2 of FIG. 2, a value obtained by multiplying the acceleration q-axis current command value iqf* by the IP coefficient KIP and the q-axis proportional gain Gqp is added to the controller output voltage Δeq.

Here, in the τf/iqf* converter 3, the conversion formula differs according to the motor type. For example, in the case of an induction motor (IM), calculation is performed by formula (4), and in the case of a surface magnet synchronous motor (SPMSM), calculation is performed by formula (5). Although an exemplary conversion formula having its basis in the torque generation principle exists likewise for the case of an interior magnet synchronous motor (IPMSM)) and for the case of a reluctance synchronous motor (SynRM), detailed description thereof will not be provided herein.

$$i_{qf}^* = \tau_f / \{p \cdot M0(\varphi dr/M)\}, \text{ where} \quad (4)$$

$p$ = number of motor pole pairs, and $M0$ = mutual inductance $$i_{qf}^* = \tau_f / (p \cdot \Phi f), \text{ where } \varphi f = \text{permanent magnet magnetic flux} \quad (5)$$

A formula representation of the input-output relationship in the q-axis current controller 2 is as shown in formula (6).

$$\Delta e_q = \{K_{IP} \cdot i_{qf}^* + (I - K_{IP})(i_q^* - i_q)\} G_{qp} + (i_q^* - i_q) G_{qi}/s - K_{IP} \cdot i_q \cdot G_{qp} \quad (6)$$

Formula (6) simplifies to formula (7).

$$\Delta e_q = \{K_{IP}(i_{qf}^* - i_q) + (I - K_{IP})(i_q^* - i_q)\} G_{qp} + (i_q^* - i_q) G_{qi}/s \quad (7)$$

The q-axis current command value $i_q^*$ contains a resonance mechanical vibration component which is mixed therein from a speed detection value ωm obtained in the speed loop. Accordingly, in formula (8), $i_q^*$ is defined by being divided into the acceleration q-axis current command value $i_{qf}^*$ and a q-axis current command value portion containing the mechanical vibration component (hereinafter referred to as a "vibration component-containing q-axis current command value ivb").

$$i_q^* = i_{qf}^* + i_{vb} \quad (8)$$

Using the definition according to formula (8), formula (7) can be expressed as formula (9).

$$\Delta e_q = (i_{qf}^* - i_q) G_{qp} + (I - K_{IP}) i_{vb} G_{qp} + (i_q^* - i_q) G_{qi}/s \quad (9)$$

A major feature of the q-axis current controller 2 of the present embodiment is that a value obtained by multiplying the vibration component-containing q-axis current command value ivb by a factor of (1−KIP) is subject to proportional amplification (by $G_{qp}$).

Based on formula (9), the output of the q-axis current controller 2 can be summarized as follows.

Figure 3:
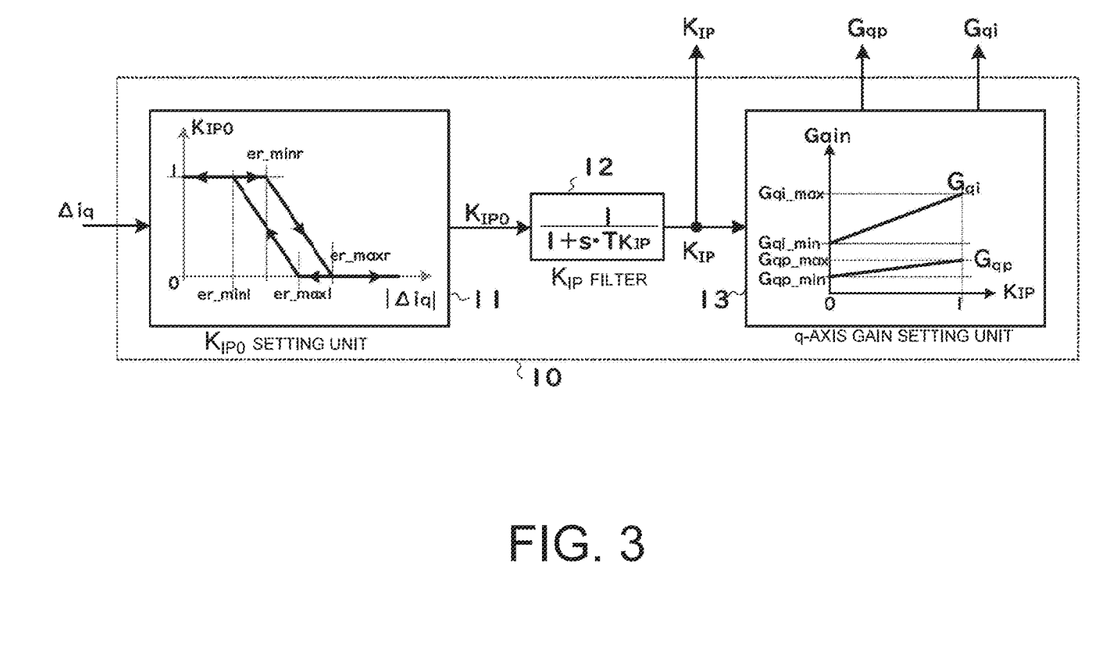
FIG. 3 is a block diagram showing an example configuration of a coefficient/gain setting unit.

When $K_{IP} = 1$: $\Delta e_q = (i_{qf}^* - i_q) G_{qp} + (i_q^* - i_q) G_{qi}/s => \quad (10.1)$ $I{-}P$ control having enhanced command following performance When $K_{IP} = 0$: $\Delta e_q = (i_q^* - i_q)(G_{qp} + G_{qi}/s) => PI$ control $\quad (10.2)$ Next, the configuration and operation of a coefficient/gain setting unit 10 shown in FIG. 2 will now be described. FIG. 3 is a block diagram showing an example configuration of the coefficient/gain setting unit 10. In the present embodiment, the q-axis current error $\Delta i_q$ serves as an input to the coefficient/gain setting unit 10. A $K_{IP0}$ setting unit 11 receives input of the absolute value $|\Delta iq|$ of the q-axis current error $\Delta i_q$, and outputs an initial IP coefficient value $K_{IP0}$ according to $|\Delta i_q|$.

The q-axis current controller 2 operates with the objective of satisfying $|\Delta iq|\approx 0$. Accordingly, when $|\Delta iq|$ is small, in aiming to improve disturbance suppression performance and stability, the KIP0 setting unit 11 outputs an initial IP coefficient value KIP0 increased toward 1. On the other hand, when $|\Delta iq|$ is large, in aiming to improve command following performance, the KIP0 setting unit 11 outputs an initial IP coefficient value KIP0 decreased toward 0 so as to reduce $|\Delta iq|$.

In the KIP0 setting unit 11 of the present embodiment, in order to smooth sudden changes in the initial IP coefficient value KIP0 when the direction of numerical value change (increase or decrease) in $|\Delta iq|$ has suddenly reversed, four change points (er_min1≤er_minr≤er_max1≤er_maxr) are set on a horizontal $|\Delta iq|$ axis, and a hysteresis characteristic is provided in the direction of increase and the direction of decrease of $\Delta iq|$.

The IP coefficient KIP0 is filtered in a KIP filter 12 by a primary delay processing using a time constant TKIP, and output as a final IP coefficient KIP. The time constant TKIP is set to approximately several ms to several ten ms, but may be varied according to steepness between position command values X issued to the control device 1.

A q-axis gain setting unit 13 calculates and outputs the q-axis proportional gain Gqp and the q-axis integral gain Gqi according to the IP coefficient KIP (0≤KIP≤1). In the present embodiment, with regard to Gqp and Gqi, the q-axis gain setting unit 13 has a KIP-gain characteristic that, when graphed, is increasing rightward, and Gqp_min and Gqi_min for when KIP=0, as well as Gqp_max and Gqi_max for when KIP=1, are set in advance.

Figure 4:
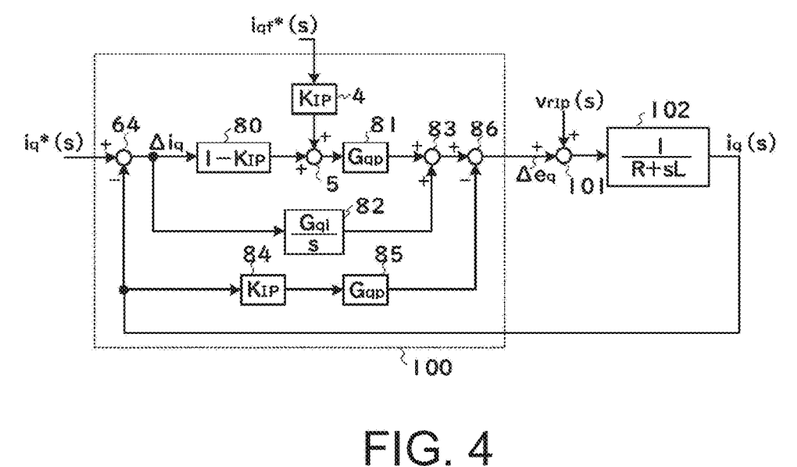
FIG. 4 is a block diagram model for determining frequency characteristics of a q-axis current controller.

FIG. 4 is a block diagram model for evaluating characteristics of a q-axis current controller. In FIG. 4, the q-axis current controller 100 corresponds to one obtained by removing the τf/iqf* converter 3 and the coefficient/gain setting unit 10 from the q-axis current controller 2 shown in FIG. 2. To the controller output voltage Δeq of the q-axis current controller 100, voltage disturbance vrIP is added in an adder 101, and the obtained voltage serves as the input voltage to a target plant model 102 that simulates q-axis motor winding. The output from the target plant model 102 is provided as feedback to the q-axis current controller 100 as the q-axis current detection value iq.

Figure 5:
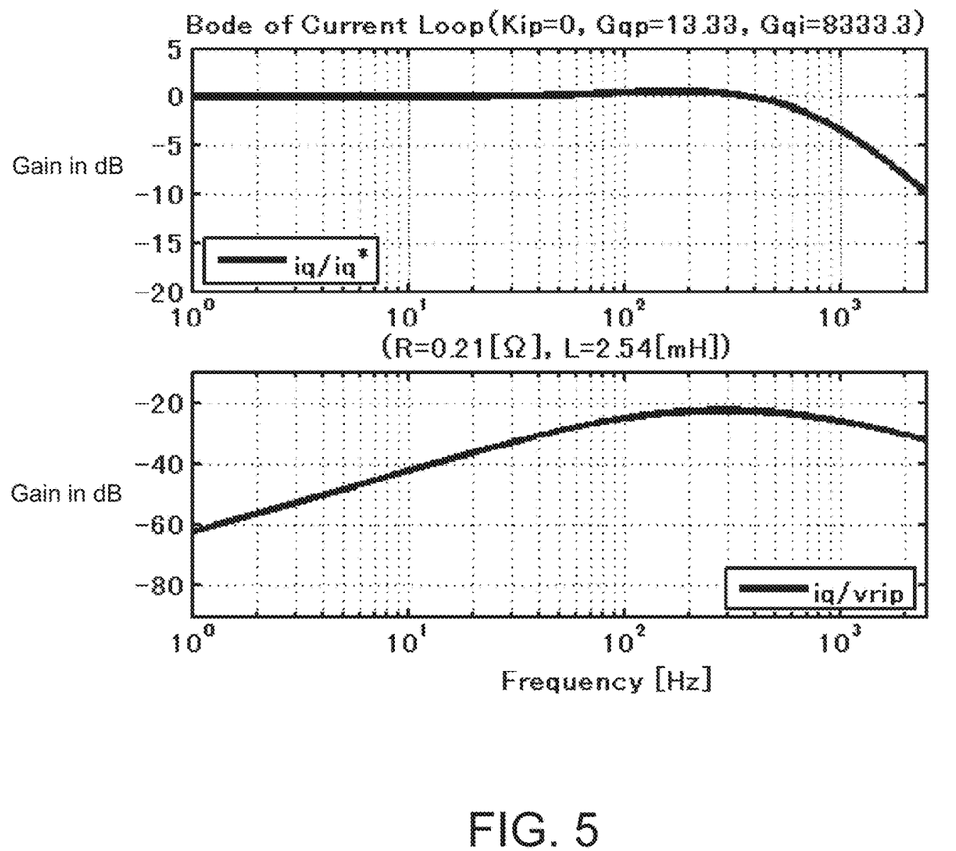
FIG. 5 is a graph showing example frequency characteristics of the q-axis current controller when $K_{IP}=0$.
Figure 6:
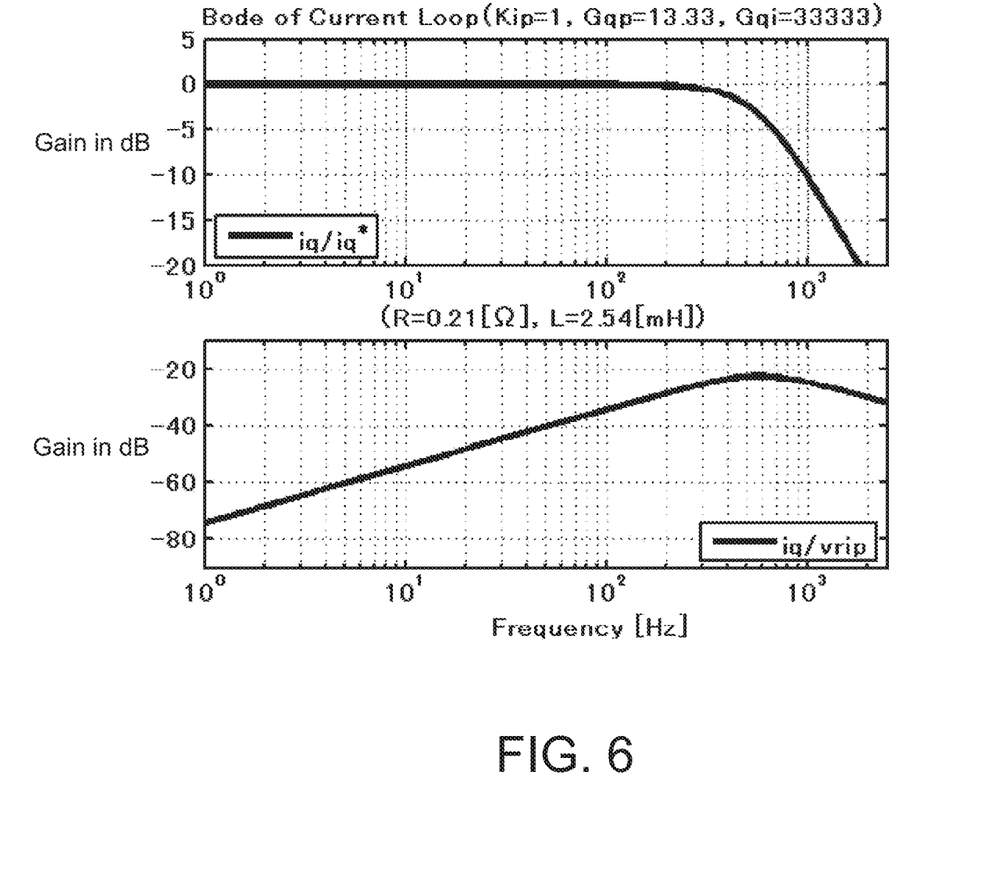
FIG. 6 is a graph showing example frequency characteristics of the q-axis current controller when $K_{IP}=1$.

FIG. 5 and FIG. 6 are graphs showing frequency characteristics concerning the block diagram model of FIG. 4. FIG. 5 shows frequency characteristics of command response (iq/iq*) and disturbance suppression (iq/vrIP) at the time when the IP coefficient KIP is fixed to KIP=0. This example is equivalent to frequency characteristics resulting from PI control.

FIG. 6 shows frequency characteristics of command response (iq/iq*) and disturbance suppression (iq/vrIP) at the time when the IP coefficient KIP is fixed to KIP=1. From the perspective of the q-axis current command value iq*, this case is I-P control, and since high stability can be ensured, the q-axis integral gain Gqi can be set to a large value. More specifically, Gqi_max=4·Gqi_min; that is, Gqi is set four times as large as that when KIP=0 in the case of FIG. 5. As for the q-axis proportional gain Gqp, Gqp_max=Gqp_min; that is, the proportional gain is the same in FIG. 5 and FIG. 6.

In the present embodiment, a difference (iqf*−iq) between the acceleration q-axis current command value iqf* and the q-axis current detection value iq is amplified by the q-axis proportional gain Gqp and added to the proportional component of the q-axis current controller 2, so that even when KIP is increased toward 1, high command following performance equivalent to that of PI control is exhibited with respect to iqf*. Accordingly, operation can be performed with KIP≈1 at all times including times of acceleration and deceleration.

In FIG. 6 (where KIP=1) showing a state of control according to the present embodiment, Gqi having a value four times as large is set, and as a result, concerning disturbance suppression (iq/vrIP), in comparison with FIG. 5 (where KIP=0), disturbance response is reduced by 10 dB to 12 dB, or in other words, voltage disturbance suppression performance is improved, in the frequency band of several ten Hz and lower.

In the PWM inverter (not shown in drawing) included in the d-q/three-phase converter 69 of FIG. 1, in order to avoid failure due to short-circuiting between two power switching elements connecting between DC buses, a dead time is provided. At the time when the current direction of each of U, V, and W phases is reversed, discontinuous voltage changes caused by the dead time are applied to the motor coils. The improvement in voltage disturbance suppression performance according to the present embodiment can reduce fluctuations in q-axis current due to influence of the dead time.

Concerning command response (iq/iq*) in FIG. 6 (when KIP=1), since this case is I-P control, stability is not impaired even when Gqi having a value four times as large is set. Further, in comparison with FIG. 5 (where KIP=0), a reduction of 2 dB at 500 Hz, a reduction of 8 dB at 1000 Hz, and a reduction of 14 dB at 2000 Hz are achieved, and as such, a sharp drop (shut-off) characteristic of −40 dB/dec is achieved in the frequency band of several hundred Hz and higher.

The q-axis current control loop serves the role of a torque control loop. Accordingly, a single-loop gain of the speed control loop to which the technique disclosed in the present specification is applied has reflected therein a high shut-off characteristic in the high-frequency region of the q-axis current control. As a result, mechanical resonance vibration suppression filters, such as multi-stage notch filters, which are inserted in a conventional speed control loop can be reduced, and a simple speed control loop can be constructed.

Figure 7:
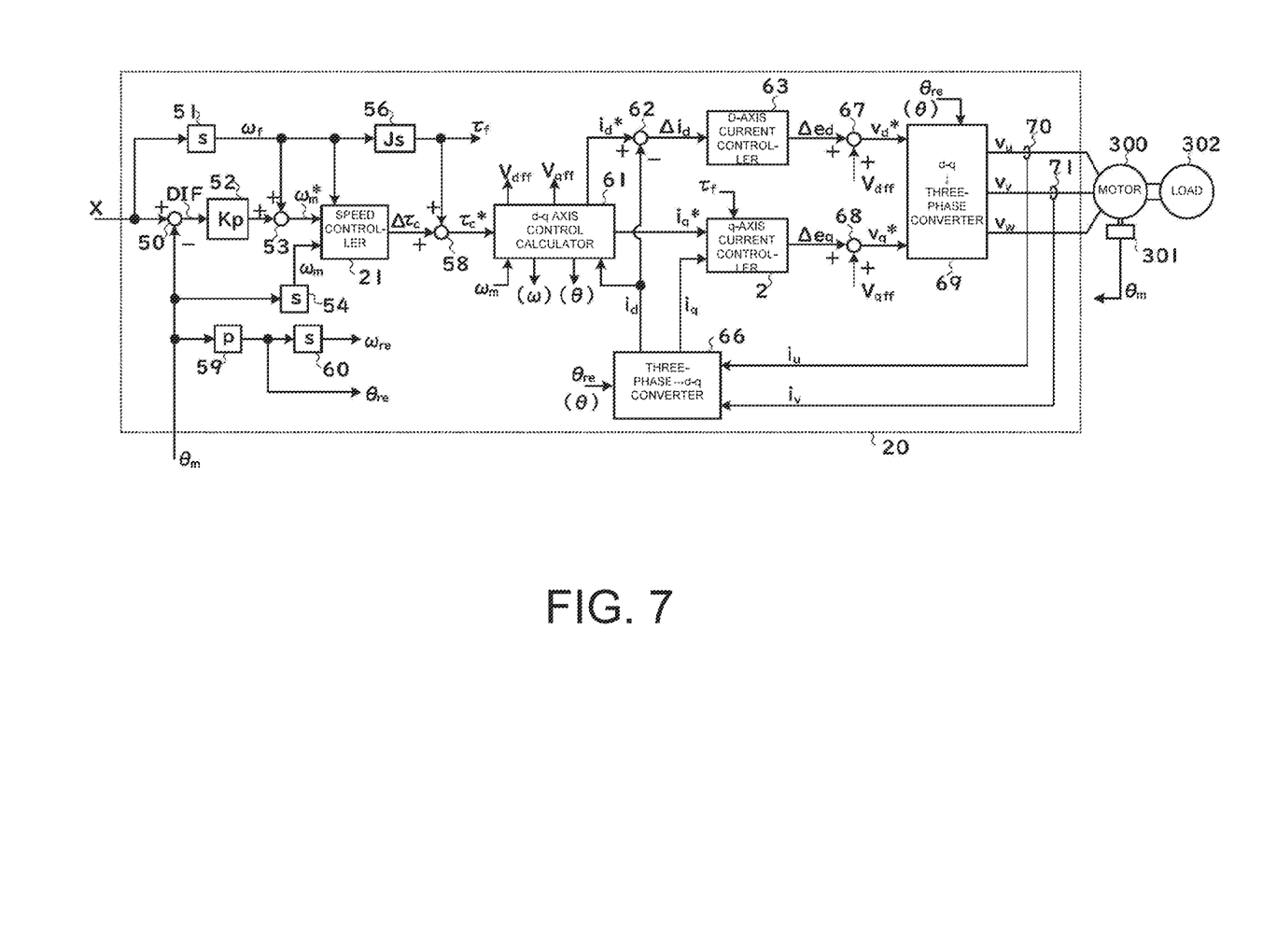
FIG. 7 is a block diagram showing another example configuration of a control device using a three-phase alternating current motor as a drive motor.

FIG. 7 is a block diagram showing another embodiment of a control device 20 for three-phase alternating current motor. Since parts other than a speed controller 21 are identical to those of FIG. 1 described above, like reference numerals are assigned thereto, and description thereof will not be repeated.

Figure 8:
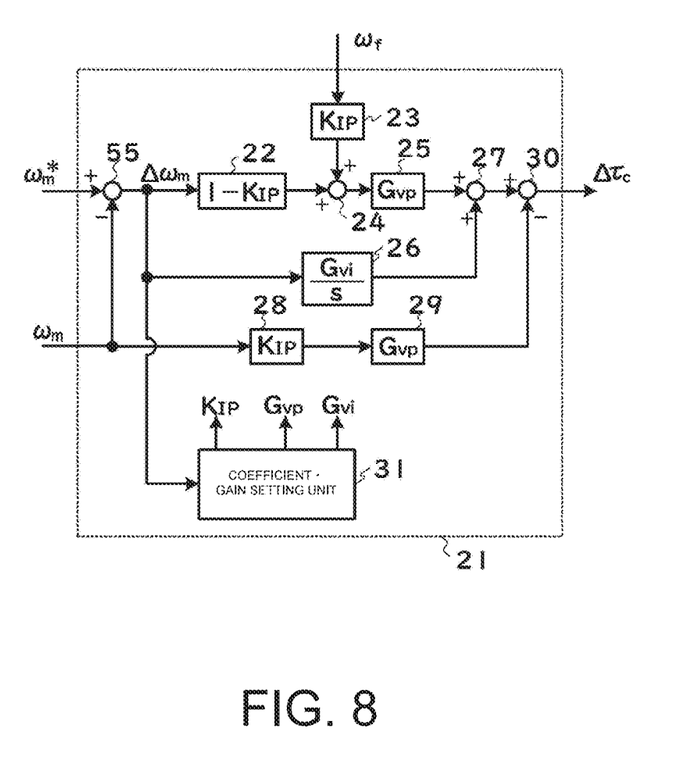
FIG. 8 is a block diagram showing an example configuration of a speed controller.

The speed controller 21 receives input of a speed command value ωm*, a sub speed command value ωf, and a speed detection value ωm, and outputs a controller output torque Δτc. FIG. 8 is a block diagram showing an example configuration of the speed controller 21. The operation of the speed controller 21 will now be described using FIG. 8.

The speed controller 21 has a configuration obtained by substituting the q-axis current controller 2 of FIG. 2 described above for speed control application, but since the names of signals and the like are different, the entire configuration will be described below. The speed controller 21 of FIG. 8 adds together, in an adder 24, a value obtained by amplifying the sub speed command value ωf by a factor of KIP in an amplifier 23 and a value obtained by amplifying Δωm by a factor of (1−KIP) in an amplifier 22. The output of the adder 24 is amplified by a factor of a speed proportional gain Gvp in a proportional amplifier 25. In other words, in the speed controller 21 of FIG. 8, a value obtained by multiplying the sub speed command value ωf by the IP coefficient KIP and the speed proportional gain Gvp is added to the controller output torque Δτc.

Meanwhile, the speed error Δωm is subjected to integral amplification in an integral amplifier 26 having a speed integral gain Gvi, and added to the output from the proportional amplifier 25 in an adder 27. The speed detection value ωm is amplified by a factor of KIP in an amplifier 28, and then amplified by a factor of the proportional gain Gvp in a proportional amplifier 29. A subtractor 30 subtracts the output of the proportional amplifier 29 from the output of the adder 27, and outputs the controller output torque Δτc.

A formula representation of the input-output relationship in the speed controller 21 is as shown in formula (11).

$$\Delta \tau_c = \{K_{IP}(\omega_f - \omega_m) + (1 - K_{IP})(\omega_m^* - \omega_m)\}G_{vp} + (\omega_m^* - \omega_m)G_{vi}/s \quad (11)$$

Based on formula (11), the output of the speed controller 21 can be summarized as follows.

$$\text{When } K_{IP} = 1: \Delta \tau_c = (\omega_f - \omega_m)G_{vp} + (\omega_m^* - \omega_m)G_{vi}/s \implies \quad (12.1)$$

I−P control having enhanced command following performance $$\text{When } K_{IP} = 0: \Delta \tau_c = (\omega_m^* - \omega_m)(G_{vp} + G_{vi}/s) \implies PI \text{ control} \quad (12.2)$$

Next, the configuration and operation of a coefficient/gain setting unit 31 shown in FIG. 8 will now be described. The configuration of the coefficient/gain setting unit 31 is one obtained by substituting, without modification, the coefficient/gain setting unit 10 shown in FIG. 3 for speed control application. The configuration (not shown in drawing) is formed by serially connecting: a $K_{IP0}$ setting unit that sets an initial IP coefficient value $K_{IP0}$ according to the absolute value $|\Delta\omega_m|$ of the speed error $\Delta\omega_m$ received as an input; a $K_{IP}$ filter; and a speed gain setting unit by which the proportional gain $G_{vp}$ and the integral gain $G_{vi}$ of the speed controller are set according to $K_{IP}$, with a characteristic that, when graphed, is increasing rightward.

The speed controller 21 operates with the objective of satisfying |Δωm|≈0. Accordingly, in an example operation of the speed controller 21, as with the q-axis current controller 2, when |Δωm| is small, in aiming to improve disturbance suppression performance and stability, operation is performed to increase the IP coefficient KIP toward 1, and the integral gain Gvi is thereby increased. On the other hand, when |Δωm| is large, in aiming to improve command following performance, operation is performed to decrease KIP toward 0, and the integral gain Gvi is thereby decreased, such that |Δωm| becomes reduced.

In the present embodiment, a difference (ωf−ωm) between the speed command value ωf and the speed detection value ωm is amplified by the proportional gain Gvp and added to the proportional component of the speed controller 21, so that even when KIP is increased toward 1, high command following performance equivalent to that of PI control is exhibited with respect to ωf. Accordingly, operation can be performed with KIP≈1 at all times including times of acceleration and deceleration, and disturbance suppression performance can be improved.

Since disturbance in a speed controller acts as torque disturbance, the improvement in disturbance suppression performance enables reduction in a drop in speed impact caused by load torque, and improves speed regulator performance required for skiving and the like.

REFERENCE SIGNS LIST

1 control device; 2 q-axis current controller; 3 $\tau_f/i_{qf}^*$ converter; 4 amplifier; 5 adder; 10 coefficient/gain setting unit; 11 $K_{IP0}$ setting unit; 12 $K_{IP}$ filter; 13 q-axis gain setting unit; 20 control device; 21 speed controller; 22 amplifier; 23 amplifier; 24 adder; 25 proportional amplifier; 26 integral amplifier; 27 adder; 28 amplifier; 29 proportional amplifier; 30 subtractor; 31 coefficient/gain setting unit; 50 subtractor; 51 differentiator; 52 position deviation amplifier; 53 adder; 54 differentiator; 55 subtractor; 56 differentiator; 57 speed controller (conventional); 58 adder; 59 multiplier; 60 differentiator; 61 d-q axis control calculator; 62 subtractor; 63 d-axis current controller; 64 subtractor; 65 q-axis current controller (conventional); 66 three-phase/d-q converter; 67 adder; 68 adder; 69 d-q/three-phase converter; 70 U-phase current detection circuit; 71 V-phase current detection circuit; 80 amplifier; 81 proportional amplifier; 82 integral amplifier; 83 adder; 84 amplifier; 85 proportional amplifier; 86 subtractor; 100 q-axis current controller (block diagram model); 101 adder (block diagram model); 102 target plant model (block diagram model); 200 position control device (conventional); 300 motor; 301 position detector; 302 load.

The invention claimed is:

1. A control device for three-phase alternating current motor, the control device configured to control current of a three-phase alternating current motor by d-q axis control, the control device comprising
   a q-axis current controller configured to receive, as one input, an acceleration torque command value calculated based on a position command value, and output a controller output voltage to be added to a q-axis voltage command value, wherein
   the q-axis current controller
      calculates, based on the acceleration torque command value, an acceleration q-axis current command value, which is a current command value corresponding to the acceleration torque command value, and
      adds, to the controller output voltage, a value obtained by multiplying the acceleration q-axis current command value by an IP coefficient indicating a ratio of switching between PI control and I-P control and by a q-axis proportional gain.

2. The control device for three-phase alternating current motor according to claim 1, wherein
   assuming that the IP coefficient is denoted by $K_{IP}$,
   the q-axis current controller further
      amplifies, by the q-axis proportional gain, a value obtained by multiplying a q-axis current error, which is a deviation between a q-axis current command value and a q-axis current detection value, by a factor of $(1-K_{IP})$, and adds this amplified value to the controller output voltage, and
      amplifies, by the q-axis proportional gain, a value obtained by multiplying the q-axis current detection value by a factor of $K_{IP}$ and subtracts this amplified value from the controller output voltage.

3. The control device for three-phase alternating current motor according to claim 1, wherein
the q-axis current controller further
determines an initial value of the IP coefficient from an absolute value of a q-axis current error, which is a deviation between a q-axis current command value and a q-axis current detection value,
performs a primary delay processing on the initial value of the IP coefficient and outputs the IP coefficient, and
outputs the q-axis proportional gain and a q-axis integral gain based on the output IP coefficient.

4. The control device for three-phase alternating current motor according to claim 1, further comprising
a speed controller configured to receive, as one input, a sub speed command value obtained by differentiating the position command value with respect to time, and output a controller output torque to be added to a torque command value, wherein
the speed controller adds, to the controller output torque, a value obtained by multiplying the sub speed command value by the IP coefficient and a speed proportional gain.

* * * * *